United States Patent [19]

Henry et al.

[11] Patent Number: 4,985,160

[45] Date of Patent: Jan. 15, 1991

[54] BRANCHED POLYMERS AS FUEL OIL ADDITIVES

[75] Inventors: Cyrus P. Henry, Claymont; Harry J. Spinelli, Wilmington, both of Del.

[73] Assignee: E. I. du Pont de Nemours and Company, Wilmington, Del.

[21] Appl. No.: 307,500

[22] Filed: Feb. 8, 1989

[51] Int. Cl.$^5$ ........................................... C10M 145/14
[52] U.S. Cl. ................................. 252/51.5 R; 525/293
[58] Field of Search ............. 252/51.5 R, 77; 526/75, 526/304; 525/293

[56] References Cited

U.S. PATENT DOCUMENTS

| 2,737,452 | 3/1956 | Catlin. | |
|---|---|---|---|
| 2,737,496 | 3/1956 | Catlin. | |
| 3,186,810 | 6/1965 | Dunworth. | |
| 3,490,882 | 1/1970 | Dunworth. | |
| 4,656,226 | 4/1987 | Hutchins et al.. | |
| 4,715,975 | 12/1987 | Kapusciniski | 525/293 |

Primary Examiner—Jacqueline V. Howard
Attorney, Agent, or Firm—Charles J. Shoaf

[57] ABSTRACT

Oil soluble copolymers comprised of an addition-type polymeric main chain and a plurality of addition-type polymeric side branches which contain basic amine groups are disclosed which stabilize distillate fuel and lubricating oil compositions against deterioration during storage.

18 Claims, No Drawings

BRANCHED POLYMERS AS FUEL OIL ADDITIVES

BACKGROUND OF THE INVENTION

Fuel oil such as home heating fuels, automotive fuel oils, gas turbine fuels, and heavy fuels used for industrial heating and for slow and medium speed diesel engines, as well as lubricating oils for engines and other uses, are susceptible to deterioration during storage, resulting in the formation of insoluble sludge, sediment and discoloration. A wide variety of additives, especially various amine compounds have been proposed and used to prevent discoloration and sediment formation by retarding the formation of discolorants or insoluble materials during storage or when thermally stressed. One example is N,N-dimethylcyclohexylamine as disclosed in U.S. Pat. No. 3,490,882. Other additives such as copolymers characterized by having basic amino groups appended to the main polymer chain are known as disclosed in U.S. Pat. No. 3,186,810 and 2,737,452 for use in fuel oils and in U.S. Pat. No. 2,737,496 for use in lubricating oils. Such copolymers have been comprised of such monomers as lauryl methacrylate, diethylaminoethyl methacrylate, styrene and other alkyl methacrylates and amino methacrylates. Although useful, such additives do not provide a complete solution to the problems and the need for improved additives remains.

This invention is concerned with improved additives for stabilizing fuel and lubricating oil compositions against deterioration during storage and stabilized oil compositions containing the additives.

Also U.S. Pat. No. 4,656,226 discloses certain block copolymer dispersants containing methacrylate and acrylate monomeric units wherein a polymer block may contain certain polar groups, among which are mentioned primary, secondary and tertiary aliphatic amines, as substituents which are bonded to the polymer block. A general disclosure is included that such dispersants can be used as additives for oil and fuel.

An object of this invention is to improve the stability of petroleum distillate oils against deterioration such as the formation of insoluble sludge, sediment, gum and discoloration. A further object is to provide a novel improved additive for stabilizing distillate hydrocarbon fuel oils.

SUMMARY OF THE INVENTION

This invention provides an oil soluble, basic amine-containing copolymer comprised of an addition-type polymeric main chain and a plurality of addition-type polymeric branches extending from the side thereof, wherein the main polymer chain is comprised of monomeric units derived from one or more polymerizable ethylenically unsaturated monomers with each monomer containing only one polymerizable ethylenic linkage and the main chain comprises from about 50 to 99.5% by weight of the copolymer, and the polymeric side branches are comprised of monomeric units derived from one or more polymerizable ethylenically unsaturated monomers with each monomer containing only one polymerizable ethylenic linkage, and from about 10 to 100% of the monomeric units in the branches contain a basic amine group and the branches comprise from about 0.5 to 50% by weight of the copolymer.

Preferably the monomeric units of the main polymer chain contain an alkyl substituent group containing from 1 to 60 carbon atoms and more preferably from 1 to 20 carbon atoms for compatibility with the oil. The alkyl substituents include cycloalkyl groups such as cyclohexyl groups.

Also for compatibility with the oil it is preferred that the main polymer chain be free of substituent polar groups, including basic amine groups.

Both the main polymer chains and the polymeric branches may be of a homopolymer or copolymer nature, including random and blocked copolymers. Preferred monomer units for both polymer chains are derivatives of acrylic or methacrylic acid. The polymeric branches preferably have a number average molecular weight of above 500. A highly preferred additive of the invention, for reasons of economics, ease of preparation and overall effectiveness, is a copolymer comprised of lauryl methacrylate in the main chain and branches comprised of dimethylaminoethyl methacrylate.

DETAILED DESCRIPTION OF THE INVENTION

This invention is based on the discovery that branched polymers that have basic amine groups in polymeric side branches are unusually effective in stabilizing oil compositions against deterioration such as insoluble sludge formation as compared to copolymers containing basic amine groups as substituents attached to a linear polymer chain.

The copolymers of the invention can be made by various processes including: (a) copolymerizing amine containing branch-forming macromonomers with non-amine containing monomers to form the main polymer chain having the macromonomeric branches, (b) first making a main chain polymer containing graftable sites, such as alkyl methacrylate, and then grafting amine-containing branches onto the main chain by polymerizing amine-containing monomers, with or without other monomers, in the presence of the main polymer chain so as to get attachment between the main chain and branches of the other monomers, or (c) pre-forming a main polymer chain containing functional groups capable of reacting with pre-formed amine-containing branch polymers that contain another functional group which is reactive with the functional group on the main chain.

The macromonomers of method (a) can be made by any of several techniques, for example, by group transfer polymerization as taught by Spinelli, et al. in U.S. Pat. No. 4,746,714, by anionic polymerization as taught by Milkovich, U.S. Pat. No. 3,786,116, by conventional free radical polymerization techniques using functionalized initiators as taught in U.K. Patent No. 2,142,637A or chain transfer agents, or by the cobalt chain transfer technique as taught by Cacioli, et al., J. of Macromolecular Science - Chemistry Edition, A23(7), 839(1986). The disclosures of these references are incorporated herein by reference.

In similar fashion these macromonomers, once provided with a single terminal unit containing a single ethylenic unsaturated group, may be copolymerized with other ethylenically unsaturated monomers using a variety of techniques, including free radical, group transfer polymerization, anionic polymerization among others, to form the main chain as the last step in the preparation.

The non-macromonomer techniques for making branched polymers are well-known in the art and include "grafting onto" and "grafting from" processes as well as others as disclosed in Sperling "Recent Advances in Polymer Blends, Grafts, and Blocks", Plenum Press, New York, 1974, pp. 38–43 and Vollmert, "Polymer Chemistry", Springer-Verlag, New York, 1973, pp. 288–301. Both the main polymer chain and the branch polymers may contain other functional groups such as alcohols, carboxylic acids, epoxides, amides and so forth provided such groups do not substantially retard the performance of the stabilizer.

Particular examples of the amine containing monomers include: the basic amino substituted olefins such as p-(2-diethylaminoethyl)styrene; basic nitrogen containing heterocycles having a polymerizable ethylenically unsaturated substituent such as the vinyl pyridines or the vinyl pyrolidones; esters of amino alcohols with unsaturated carboxylic acids such as the alkyl and cycloalkyl esters of acrylic and methacrylic acid, e.g. dimethylaminoethyl methacrylate, diethylaminoethyl methacrylate, 4-diethylaminocyclohexyl methacrylate, dimethylaminoethyl acrylate, and the like; unsaturated ethers of amino alcohols such as aminoethyl vinyl ether; amides of unsaturated carboxylic acids wherein a basic amino group is carried on the amide nitrogen such as N-(2-dimethylaminoethyl)acrylamide; and polymerizable unsaturated basic amines such as allyl amine.

The term amino containing monomers is used in a generic sense to cover the primary, secondary, and tertiary amines including, as stated above, the basic nitrogen-containing heterocycles.

The amino functionality may also be introduced onto the side chains by first making the side chain with a functional monomer that can be post reacted with compounds to introduce amino functionality, e.g. the side chain may contain a homopolymer or copolymer of glycidyl methacrylate which can be reacted with amine functionality to the side chain.

Examples of the ethylenically unsaturated monomers present in the main chain and perhaps as a comonomer in the side chain include: C1 to C60 alkyl and cycloalkyl esters of acrylic and methacrylic acid and the derivatives of acrylic and methacrylic acid, e.g. methyl methacrylate, butyl methacrylate, ethylhexyl methacrylate, lauryl methacrylate, tridecyl methacrylate, butyl acrylate, ethylhexyl acrylate, isobornyl methacrylate, cyclohexyl methacrylate, acrylonitrile and the like; monoolefins such as styrene, t-butyl styrene, ethylene, propylene, and the like; and short chain vinyl ethers such as ethyl vinyl ether, butyl vinyl ether, and the like.

The polymers of this invention may be mixed with fuels by addition of the concentrated solution in a solvent miscible with fuel, or after dilution with fuel or other solvents. Addition can be undertaken at the refinery, during distribution of fuel oil, by the ultimate consumers of fuel or otherwise as may be conveniently practiced.

A polymer solution may also be pre-mixed with other additives to improve stabilizing performance, for example, N,N'disalicylidene-1,2-propane-diamine (DMD) or N,N-dimethyl-cyclohexylamine. The polymer solution may also be pre-mixed with other additives which improve other properties of fuel oils, for example, low temperature flow improvers, corrosion inhibitors, electrical conductivity improvers, cetane improvers, and dyes.

The quantity of additive employed in practicing this invention will depend on the initial condition and degree of stability of the fuel oil and the effect desired.

While the polymer may be used in proportions of 0.5 mg/liter to 500 mg/liter of fuel oil, normally 2 to 100 mg/liter will be used. Generally, the additive will be in the form of a solution of the polymer in hydrocarbon or ether solvents that are miscible or compatible with the fuel or lube oils; generally in concentrations of 10–70%, preferably 10–50%, depending on the practical upper limit of viscosity.

The following examples are given to illustrate this invention, modes of practicing it, and advantageous results to be obtained. Parts, proportions and percentages herein are by weight except where indicated otherwise.

INTRODUCTION TO EXAMPLES

Test Procedures

This effectiveness of the polymer to inhibit deterioration and disperse sediment is illustrated by and 80° C. (175° F.) seven-day storage test on samples of unstable fuels. Several fuels containing unstable thermally or catalytically cracked components blended with kerosene or straight run fuels were used. Sediment formed during the aging period was compared to sediment content with no polymer or additive, and expressed as a percent of reduction in sediment compared with no additive. The tests used to determine amounts of sediments (or sludge) caught on a filter gave equivalent results to gravimetric tests done using ASTM Method D-2274, normalized to values of 100 for samples with no additive. These examples were compositions which might be typically used for No. 2 home heating or automotive diesel fuels. The weights of sediment formed during seven days' aging at 80° C. was 4 to 9 mg/100 ml without additive. Less than 2 mg sediment/100 ml is considered a desirable goal. Although the present invention does not reach this ultimate goal with all the tested fuels, it is a substantial improvement over the prior art.

The following examples show these materials to have novel properties as oil additives. An important aspect of the invention is the arrangement of the two monomer types into segments of greatly different solubility characteristics; i.e. a polar,tertiary-amine-containing branch, and a non-polar backbone. This arrangement gives effective dispersion characteristics.

This branched arrangement gives materials of greater sludge-dispersing properties than the random linear arrangements of the same co-monomers as is already widely practiced in the oil additives art.

EXAMPLE 1 DMAEMA MACROMONOMER OF 3,000 MOL. WEIGHT CAPPED WITH TMI

A 1-liter flask is equipped with mechanical stirrer, thermometer, $N_2$ inlet, drying tube outlet, and addition funnels. Toluene, 250.0 gm, and p-xylene, 2.3 gm is charged to the flask. The catalyst tetrabutyl ammonium m-chlorobenzoate 0.4 ml of a 1.0M solution in acetonitrile, is then added. Initiator, 1-(2-trimethylsiloxyethoxy)-1-trimethylsiloxy-2-methyl propene, 11.58 gm is injected. Feed I [tetrabutyl ammonium m-chlorobenzoate, 0.2 ml, tetrahydrofuran (THF), 4.04 gm] is started and added over 123 minutes. Feed II [dimethylaminoethyl methacrylate (DMAEMA), 250.0 gm] is started at 0.0 minutes and added over 39 minutes. At 140 minutes the reaction is quenched with 40 gm isopropanol, 7.6 gm water, 18.5 gm of methanol, and 0.06 gm of dichloroacetic acid. It is then refluxed for 2 hours. 146.0 gm of solvent is distilled off until pot temperature equals approximately 106° C. This generates a 3,000 number average molecular weight (Mn) polymer that has one hydroxyl group at the end of the chain.

Preparation of Macromonomer

The macromonomer is prepared by reacting the hydroxyl group with TMI, a commercial isocyanate containing alpha methyl styrene compound. The hydroxyl group reacts with the isocyanate and a polymerizable styrene double bond is attached to the end of the polymer chain.

To the above solution, 20.1 gm of benzene,1-(1-isocyanato-1-methylethyl)-3-(1-methylethenyl) [TMI from American Cyanamid, an isocyanate-functional styrene], 0.34 gm of dibutyltin dilaurate (100%), 0.05 gm of di-t-butyl-catechol (10% in toluene) is added. It is refluxed for 40 minutes and quenched with 2.5 gm methanol and refluxed 30 minutes. The reaction is monitored by infrared (IR). This makes a dimethylaminoethyl methacrylate macromonomer with a Mn=3,000 and solids=52.0%.

EXAMPLE 2 RANDOMLY BRANCHED POLYMER OF LAURYL METHACRYLATE (LMA) AND DMAEMA MADE BY COPOLYMERIZING THE MACROMONOMER OF EXAMPLE 1 WITH LMA

A 250 ml flask is equipped with a mechanical stirrer, thermometer with thermowatch, nitrogen inlet, and reflux condenser. It is charged with 40 gm of Aromatic 150, a commercial solvent that is a mixture of aromatic solvents with a flash point over 150° F., 76 gm of lauryl methacrylate, and 6.15 gm of the macromonomer solution of Example 1. The solution is purged with nitrogen for 30 minutes. It is then heated and held at 82° C. Increments of a commercial initiator Vazo 64 are then added in one hour intervals. These increments are 0.1 gm (at 0 time), 0.2 gm (at 1 hour), 0.3 gm (at 2 hours), and 0.3 gm (at 3 hours). Four hours after the start of the polymerization, the reaction temperature is increased to 100° C. for 1 hour.

This reaction makes a branched polymer that has a backbone of lauryl methacrylate and side arms of dimethylaminoethyl methacrylate macromonomer LMA-G-DMAEMA 96/4 ratio by weight. It is at 65% solids and has an inherent viscosity of 0.41 as a 1% solids solution in toluene.

EXAMPLE 3 FREE RADICAL CONTROL I-A RANDOM LINEAR COPOLYMER OF STYRENE, LAURYL METHACRYLATE AND DIETHYLAMINOETHYL METHACRYLATE

A 4000 ml flask is equipped with a mechanical stirrer, thermometer with thermowatch, nitrogen inlet, and reflux condenser. It is charged with 600 gm of kerosine, 520 gm of lauryl methacrylate (LMA), 112 gm of diethylaminoethyl methacrylate (DEAMA) and 429 gm of styrene (STY). The solution is purged with nitrogen for 30 minutes. It is then heated and held at 82° C. Increments of Vazo 64 are then added in one hour intervals. These increments are 1.8 gm (at 0 time), 0.6 gm (at 1 hour), 0.6 gm (at 2 hours), and 0.6 gm (at 3 hours). Four hours after the start of the polymerization, the reaction temperature is increased to 100° C. for 1 hour. An additional 500 gm of kerosine is then added.

This reaction makes a linear copolymer of LMA/STY/DEAMA 50/40/10. It is at 49% solids.

COMPARATIVE TABLE 1

This shows the effectiveness of the branched polymer relative to the random linear polymer in reducing the amount of sediment formed. A larger value means that more reduction in sediment formation was obtained. That is, the larger the value, the better the product. An unstabilized conventional commercial petroleum distillate fuel type was used.

COMPARISON OF BRANCHED POLYMER VS RANDOM COPOLYMER

| COMPARISON OF BRANCHED POLYMER VS RANDOM COPOLYMER % SEDIMENT REDUCTION | | | |
|---|---|---|---|
| CONC. OF ADDITIVE | | CONTROL | BRANCHED POLYM |
| PTB* | MG/L | (EXAMP. 3) | (EXAMP. 2) |
| 0 | 0 | 0 | — |
| 3 | 8.5 | 18 | 35 |
| 5 | 14 | 16 | 51 |
| 8 | 23 | 17 | 66 |
| 12 | 34 | 24 | 73 |

* = POUNDS OF ADDITIVE PER THOUSAND BARRELS: 1 PTB = 2.85 MG PER LITER

The above table shows that there is a greater reduction in the amount of sediment formed when the branched copolymer of the invention is added vs the random linear copolymer control.

EXAMPLE 4 FREE RADICAL CONTROL II - A RANDOM LINEAR COPOLYMER OF LAURYL METHACRYLATE AND DIMETHYLAMINOETHYL METHACRYLATE

A 250 ml flask is equipped with a mechanical stirrer, thermometer with thermowatch, nitrogen inlet, and reflux condenser. It is charged with 40 gm of Aromatic 150, a solvent that is a mixture of aromatic solvents with a flash point over 150 F, 76.8 gm of lauryl methacrylate, and 3.2 gm of dimethylaminoethyl methacrylate. The solution is purged with nitrogen for 30 minutes. It is then heated and held at 82° C. Increments of Vazo 64 are then added in one hour intervals. These increments are 0.1 gm (at 0 time), 0.2 gm (at 1 hour), 0.3 gm (at 2 hours), and 0.3 gm (at 3 hours). Four hours after the start of the polymerization, the reaction temperature is increased to 100° C. for 1 hour.

This reaction makes random linear copolymer of lauryl methacrylate and dimethylaminoethyl methacrylate LMA/DMAEMA 96/4. It is at 65% solids and has an inherent viscosity of 0.48 as a 1% solids solution in toluene.

COMPARATIVE TABLE II

This shows the effectiveness of a series of branched polymers relative to several random polymers in reducing the amount of sediment formed. A larger value means that more reduction in sediment formation was obtained. That is, the larger the value, the better the product. The branched polymers were made by copolymerizing macromonomers in a procedure similar to Example 2. The random copolymers were made by procedures similar to those used in Examples 4 and 17. This table also shows that the branched polymer can have a wide range in molecular weight as reflected in the difference inherent viscosities used.

Fuels A to G are a series of different types of representative commercially available unstabilized petroleum distillate fuels. A large number of types is used for completeness.

Preparation of Macromonomer

The macromonomer is prepared by reacting the acid group with glycidyl methacrylate GMA. The epoxy

| | COMPARISON OF STRUCTURE AND % COMONOMER | | | | | | | | | | |
|---|---|---|---|---|---|---|---|---|---|---|---|
| | | | | % SEDIMENT REDUCTION FUELS | | | | | | | |
| EXAM. | COMONOM. | % ADDED | INH. V. | A | B | C | D | E | F | G | AVG. |
| 5* | NONE | 0 | — | 0 | 0 | 0 | 0 | 0 | 0 | 0 | 0 |
| 6 | EXAM. 1 (DMAEMA MACRO) | 1.5 | .47 | 45 | 62 | 44 | 27 | 51 | 1 | 65 | 42 |
| 7 | EXAM. 1 (DMAEMA MACRO) | 2.0 | .44 | 38 | 67 | 55 | 29 | 63 | 14 | 73 | 48 |
| 8 | EXAM. 1 (DMAEMA MACRO) | 2.5 | .43 | 46 | 67 | 49 | 31 | 46 | 9 | 68 | 45 |
| 9 | EXAM. 1 (DMAEMA MACRO) | 3.0 | .43 | 46 | 67 | 53 | 26 | 55 | 16 | 66 | 47 |
| 10 | EXAM. 1 (DMAEMA MACRO) | 3.5 | .46 | 37 | 69 | 56 | 34 | 51 | 22 | 72 | 49 |
| 11 | EXAM. 1 (DMAEMA MACRO) | 4.0 | .41 | 39 | 71 | 60 | 31 | 57 | 18 | 68 | 49 |
| 12 | EXAM. 17 (DEAEMA MACRO) | 3.0 | .42 | — | 71 | 44 | 17 | 17 | 50 | 71 | 45 |
| 13* | DMAEMA (RANDOM) | 4.0 | .48 | 14 | 3 | −16 | −4 | −4 | 20 | 27 | 6 |
| 4* | DMAEMA (RANDOM) | 3.0 | .47 | 11 | 28 | −5 | −5 | −5 | 2 | 35 | 9 |
| 14 | EXAM. 1 (DMAEMA MACRO) | 3.0 | .47 | 50 | 65 | 52 | 42 | 42 | 19 | 73 | 49 |
| 15 | EXAM. 1 (DMAEMA MACRO) | 3.0 | .59 | 51 | 71 | 54 | 57 | 57 | 38 | 68 | 57 |
| 16 | EXAM. 1 (DMAEMA MACRO) | 3.0 | .32 | 36 | 64 | 37 | 20 | 20 | 9 | 35 | 36 |

THE BRANCHED POLYMER IS ADDED AT 10 MG/L
*Not of the invention.

EXAMPLE 17 DEAEMA MACROMONOMER OF 3,000 MOL. WEIGHT CAPPED WITH GLYCIDYL METHACRYLATE (GMA)

A 1-liter flask is equipped with a mechanical stirrer, thermometer, $N_2$ inlet, drying tube outlet, and addition funnels. Toluene, 125.6 gm, THF, 127.1 gm, p-xylene, 1.4 gm is charged to the flask. The catalyst tetrabutylammonium m-chlorobenzoate TBACB, 560 ml of 1.0M solution in acetonitrile, is then added. Initiator, 1,1-bis(trimethylsiloxy) 2-methyl propene, 26.40 gm (0.114 moles) is injected. Feed I [TBACB, 560 ml of a 1.0 M solution in acetonitrile, and THF, 4 4 gm] is started and added over 65 minutes. Feed II [diethylaminoethyl methacrylate DEAEMA, 330.4 gm] is started at 0.0 minutes and added over 40 minutes. At 95 minutes the reaction is quenched with 12 gm methanol, 54 gm isopropanol, 8 gm water, and 0.3 dichloroacetic acid. It is then refluxed for 2 hours. 238 gm of solvent is distilled off. This produces a 3,000 Mn diethylaminoethyl methacrylate polymer that has one acid group at the end of the chain.

group reacts with the acid and a polymerizable double bond is attached to the end of the polymer chain.

To the above solution is added di-t-butyl catechol (1.2 ml of a 10% solution in toluene) and benzyltrimethyl ammonium hydroxide (2.0 ml of a 40% solution) are added to the pot. The initial acid number is 13.1. The pot is heated to reflux. 18.9 gm of GMA is added over 40 minutes. The reaction is refluxed for 450 minutes. Then another 7.0 gm of GMA and 126 gm of toluene is added over 40 minutes. The reaction is refluxed for a total of 750 minutes. The final acid number is 1.0. This produces a diethylaminoethyl methacrylate macromonomer at 53.9% solids whose Mn=3,000.

COMPARATIVE TABLE III

This table shows the effect of the solvent used in making the branched polymer. There seems to be no significant difference between branched polymers made in Aromatic 150 and those made in kerosine. The fuels listed here may not correspond exactly to those used in the other comparative tests.

| | COMPARISON OF SOLVENT | | | | | | | | | | |
|---|---|---|---|---|---|---|---|---|---|---|---|
| | % COMONOM* | | | | % SEDIMENT REDUCTION FUELS | | | | | | |
| EXAM. | ADDED | | SOLV. | INH. V. | A | B | C | D | E | F | G | AVG. |
| 5 | NONE | | — | — | 0 | 0 | 0 | 0 | 0 | 0 | 0 | 0 |
| 18 | 2.75 | | AROM | .59 | 57 | 66 | 74 | 57 | 48 | 52 | 59 | 59 |
| 19 | 3.0 | | AROM | .59 | 56 | 67 | 71 | 57 | 52 | 54 | 61 | 60 |
| 20 | 3.5 | | AROM | .59 | 61 | 64 | 74 | 64 | 51 | 59 | 62 | 62 |
| 21 | 4.25 | | AROM | .56 | 60 | 67 | 73 | 65 | 51 | 54 | 60 | 61 |
| 22 | 3.5 | 50% | KERO | .46 | 58 | 72 | 74 | 52 | 43 | 44 | 55 | 57 |
| 23 | 3.5 | 75% | KERO | .50 | 56 | 65 | 74 | 57 | 47 | 42 | 58 | 57 |

| | | -continued | | | | | | | | |
|---|---|---|---|---|---|---|---|---|---|---|
| COMPARISON OF SOLVENT | | | | | | | | | | |
| | % COMONOM* | | | | % SEDIMENT REDUCTION FUELS | | | | | |
| EXAM. | ADDED | SOLV. | INH. V. | A | B | C | D | E | F | G | AVG. |
| 24 | 3.5 | 100% KERO | .51 | 47 | 68 | 75 | 57 | 47 | 48 | 59 | 57 |

THE BRANCHED POLYMER IS ADDED AT 10 MG/L IN FUEL OIL

The comonomer added is the DMAEMA macromonomer of Example 1. It is copolymerized in a process similar to that used in Example 2. The differences among these examples are the amount of macromonomer used in the branched polymer and the type of solvent used. Arom is Aromatic 150 solvent. The amount of Kero indicated is the amount of kerosine used in place of Aromatic 150. That is, 50% Kero means the branched polymer was made in 50% kerosine and 50% Aromatic 150.

EXAMPLE 25 BRANCHED COPOLYMER OF EHMA AND DMAEMA MADE BY IN SITU GRAFTING

A 500 ml flask is equipped with mechanical stirrer, nitrogen inlet, thermometer with thermowatch, nitrogen inlet, and reflux condenser. It is charged with 50.0 gm of Aromatic 150, 88.3 gm of 2-ehtylhexyl methacrylate EHMA, 1.75 gm of allyl methacrylate, and 0.25 gm of dodecyl mercaptan. The reaction is purged with nitrogen for 30 minutes, then heated to 82° C. Vazo-64, 0.085 gm is then added and the reaction is held at 82° C. After 2 hours, 10.0 gm of dimethylaminoethyl methacrylate DMAEMA and 0.25 qm of Vazo-64 are then added. The reaction is held for 1 hour and 0.35 gm of Vazo-64 is added and the reaction is continued to be held at 82° C. An hour after the last add of Vazo-64, the reaction is heated to 100° C. and held for one hour. It is then diluted with 50 gm of Aromatic 150 and cooled.

This process makes a branched polymer of 50% solids and an inherent viscosity of 0.33. It has a backbone of EHMA and branches of DMAEMA. The allyl methacrylate is used to form the branched structure.

EXAMPLE 26 BRANCHED POLYMER OF EHMA AND DMAEMA MADE BY COREACTING BACKBONE POLYMER WITH PRE-FORMED BRANCHES

A FORMATION OF HYDROXY TERMINATED EHMA/EHMA//DMAEMA/POLYMER (BRANCHES)

A 3-liter flask is equipped with a mechanical stirrer, thermometer, N₂ inlet, drying tube outlet, and addition funnels. Toluene, 850.0 gm, tetrahydrofuran, 150.0 gm, p-xylene, 2.0 gm is charged to the flask. The catalyst tetrabutyl ammonium m-chlorobenzoate 3.0 ml, is then added. Initiator, 1-(2-trimethylsiloxyethoxy)1-trimethylsiloxy-2-methyl propene, 55.05 gm is injected. Feed I [tetrabutyl ammonium m-chlorobenzoate, 1.0 ml, THF, 3.46 gm] is started and added over 163 minutes. Feed II [2-ethylhexyl methacrylate EHMA, 793.9 gm] is started at 0.0 minutes and added over 61 minutes. Feed III [2-ethylhexyl methacrylate, 100.7 gm and dimethylaminoethyl methacrylate DMAEMA, 99.91 gm] is started at 90 minutes and added over 21 minutes. At 230 minutes the reaction is quenched with 90 gm isopropanol, 18.0 gm water. It is then refluxed for 2 hours. Solvent is distilled off until pot temperature equals approximately 106° C. This makes a block polymer that has one block of pure 2-ethylhexyl methacrylate and another block of EHMA/DMAEMA (EHMA//EHMA/DMAEMA 79.8//10.1/10.1) that has one hydroxyl group at the end of the polymer chain. Its theoretical Mn=5,000.

B FORMATION OF BACKBONE OF ETHYLHEXYL METHACRYLATE/IEM POLYMER

A 1-liter flask is equipped with a mechanical stirrer, thermometer, N₂ inlet, drying tube outlet, and addition funnels. Toluene, 100.0 gm, xylene, 100.0 gm is charged to the flask. The pot is heated to reflux. Feed I, the initiator solution, Vazo 67, 0.73 gm and toluene 3.83 gm is started and added over 210 minutes. Feed II [2-ethylhexyl methacrylate EHMA, 89.98 gm and 2-isooyanatoethyl methacrylate IEM, 10.46 gm] is started at 0.0 minutes and added over 87 minutes. The pot is held at reflux for a total of 230 minutes. This makes a random polymer of 2-ethylhexyl methacrylate and 2-isocyanatoethyl methacrylate (EHMA/IEM 90/10). Its Mn=8,680 and Mw=37,400. The solids is 30.0%

C A BRANCHED OF EHMA AND DMAEMA POLYMER FORMED BY REACTING A AND B (BACKBONE AND BRANCHES)

A 1-liter flask is equipped with a mechanical stirrer, thermometer, N₂ inlet, drying tube outlet, and addition funnels. The polymer solution of A, 166.8 gm, is added. Then polymer solution B, 240.0 gm, and dibutyltindilaurate, 1.0 gm of a 1% solution, is added. The pot is heated to 70° C. for 2 hours. This makes a branched polymer that has a backbone of EHMA and branches of EHMA//EHMA/DMAEMA. The Mw of this polymer is 54,700. This indicates the branches did in fact react with the backbone to form a branched polymer.

COMPARATIVE TABLES IV A B C

This table shows that a variety of different types of processes can be used to make good branched polymers. It also shows that the branched structure is superior to either the linear random or the linear block structure of maximum reduction of sediment. The commercial fuels tested here may not correspond exactly to those used in the other comparative tests. Also, the fuels used in test A may not be exactly the same as those used in either test B or test C.

| | AMINE MONOMER | | OTHER | | % SEDIMENT REDUCTION FUELS | | | | | |
|---|---|---|---|---|---|---|---|---|---|---|
| EXAMP. | TYPE | % | MONOMER | STRUCTURE | A | B | C | D | E | AVG. |
| COMPARISON OF PROCESS - A | | | | | | | | | | |

-continued

| EXAMP. | AMINE MONOMER TYPE | % | OTHER MONOMER | STRUCTURE | % SEDIMENT REDUCTION FUELS | | | | | |
|---|---|---|---|---|---|---|---|---|---|---|
| | | | | | A | B | C | D | E | AVG. |
| 5 | NONE | 0 | EHMA | — | 0 | 0 | 0 | 0 | 0 | 0 |
| 25 | DMAEMA | 10 | EHMA | BRANCHED | 12 | 45 | 33 | 0 | 41 | 26 |
| 26 | DMAEMA | 4 | EHMA | BRANCHED | 62 | 79 | 76 | 76 | 52 | 69 |
| 27 | DMAEMA | 4 | TDMA | BRANCHED | 30 | 54 | 23 | 62 | 78 | 49 |
| COMPARISON OF PROCESS - B | | | | | | | | | | |
| 5 | NONE | 0 | EHMA | — | 0 | 0 | 0 | 0 | 0 | 0 |
| 28* | DMAEMA | 10 | EHMA | RANDOM | 36 | 16 | −16 | 12 | 1 | 10 |
| 26 | DMAEMA | 4 | EHMA | BRANCHED | 54 | 44 | 0 | 22 | 38 | 30 |
| 29 | DMAEMA | 20 | EHMA | BLOCK | 17 | 19 | 8 | 16 | 20 | 16 |
| COMPARISON OF PROCESS - C | | | | | | | | | | |
| 5 | NONE | 0 | EHMA | — | 0 | 0 | 0 | 0 | | 0 |
| 28* | DMAEMA | 10 | EHMA | RANDOM | −44 | 71 | 6 | 16 | | 12 |
| 25 | DMAEMA | 10 | EHMA | BRANCHED | 9 | 73 | −5 | 66 | | 36 |
| 30** | NVP | 10 | TDMA | BRANCHED | 72 | 84 | −5 | 78 | | 57 |

*EXAMPLE 28 USES A PROCESS SIMILAR TO EXAMPLE 4
** EXAMPLE 30 USES A PROCESS SIMILAR TO EXAMPLE 25
NVP IS N-VINYLPYRROLIDONE
TDMA IS TRIDECYL METHACRYLATE
THE ADDITIVE IS ADDED AT 10 MG/L

EXAMPLE 29 A BLOCK POLYMER OF ETHYLHEXYL METHACRYLATE AND DIMETHYLAMINOETHYL METHACRYLATE

A 3-liter flask is equipped with a mechanical stirrer, thermometer, $N_2$ inlet, drying tube outlet, and addition funnels. Tetrahydrofuran, 190.0 gm, p-xylene, 2.0 gm is charged to the flask. The catalyst tetrabutyl ammonium m-chlorobenzoate 0.1 ml of a 1.0M solution in acetonitrile, is then added. Initiator, 1-methoxy-1-trimethylsiloxy-2-methyl propene, 5.8 gm is injected. Feed I [tetrabutyl ammonium m-chlorobenzoate, 0.1 ml, THF, 3.46 gm] is started and added over 160 minutes. Feed II [2-ethylhexyl methacrylate EHMA, 88.0 gm] is started at 0.0 minutes and added over 61 minutes. Feed III [dimethylaminoethyl methacrylate DMAEMA, 22.0 gm] is started at 90 minutes and added over 21 minutes. At 230 minutes the reaction is quenched with 10 gm of methanol. This makes a linear block polymer that has one block of pure 2-ethylhexyl methacrylate and another block of dimethylaminoethyl methacrylate (EHMA//DMAEMA 80//20).

EXAMPLE 30 A DMAEMA MACROMONOMER OF 3,000 MOLECULAR WEIGHT AND BROAD DISPERSITY

A 3-liter flask is equipped with a mechanical stirrer, thermometer, $N_2$ inlet, drying tube outlet, and addition funnels. Toluene, 246.2 gm, THF, 245.6 gm, p-xylene 2.3 gm is charged to the pot. The catalyst tetrabutyl ammonium m-chlorobenzoate, 0.5 ml of a 1.0M solution in acetonitrile is then added. Initiator, 1,1-bis(trimethyl siloxy)trimethyl siloxy-2-methyl propene, 19.0 gm is injected. Feed I [tetrabutyl ammonium m-chlorobenzoate, 1.0 ml, THF, 4.5 gm] is started and added over 90 minutes. Feed II [1,1-bis(trimethyl siloxy)trimethyl siloxy-2-methyl propene, 19.9 gm] is started at 0.0 minutes and added over 35 minutes. Feed III [dimethylaminoethyl methacrylate, 490.2 gm is started and added over 60 minutes. At 140 minutes the reaction is quenched with 24 gm methanol, 700 ml dichloroacetic acid, 12.1 gm water and 37.8 gm isopropanol.

1105.4 gm of above solution was stripped to pot temperature of approximately 90° C., (223 gm removed) and allowed to cool. Added 8.5 ml t-butyl ammonium hydroxide (1M in methanol), 1 ml of di-t-butyl-catechol (10% in toluene) and then returned to reflux. Feed IV [glycidyl methacrylate, 16.4 gm] is started at 0.0 minutes and added over 20 minutes. Feed V [glycidyl methacrylate, 16.2 gm] is started at 110 minutes and added over 20 minutes. Feed VI [glycidyl methacrylate, 16.4 gm] is started at 220 minutes and added over 20 minutes. Feed VII [glycidyl methacrylate, 16.3 gm] is started at 330 minutes and added over 20 minutes. At 500 minutes it is stripped to 105° C. Initial acid number, 13.66; final acid number 1.04. This makes a DMAEMA macromonomer of 3,000 molecular weight and dispersity of 2.7.

This macromonomer was used to make branched polymers of the invention that were effective as fuel oil stabilizers.

EXAMPLE 31 A BUTYL METHACRYLATE//DMAEMA 50//50 BLOCK MACROMONOMER

A 1-liter flask is equipped with a mechanical stirrer, thermometer, $N_2$ inlet, drying tube outlet, and addition funnels. Toluene, 302.4 gm, is charged to the flask. The catalyst tetrabutyl ammonium m-chlorobenzoate, 0.6 ml of a 1.0M solution in acetonitrile, is then added. Initiator, 1-(2-trimethsiloxyethoxy)-1-trimethyl siloxy-2-methyl propene, 16.58 gm is injected. Feed I [THF, 4.01, tetrabutyl ammonium m-chlorobenzoate, 0.6 ml] is started and added over 115 minutes. Feed II [n-butyl methacrylate, 151.79 gm] is started at 0.0 minutes and added over 33 minutes. Feed III dimethylaminoethyl methacrylate, 151.19 gm] is started at 65 minutes and added over 30 minutes. At 190 minutes the reaction is quenched with 25.0 gm i-propanol, 5.0 gm water. This generates a polymer that has one hydroxyl group at the end of the chain.

Preparation of Macromonomer

The macromonomer is prepared by reacting the hydroxyl group with IEM, an isocyanate containing methacrylate. The hydroxyl group reacts with the isocyanate and a polymerizable double bond is attached to the end of the polymer chain.

The above solution is refluxed, and solvent is ripped from the pot until the head temperature is approximately equal to 105° C. To the above solution, 18.6 gm of isocyanatoethyl methacrylate IEM, 1.0 gm of dibutyltin dilaurate (1%), 1.8 gm of di-t-butyl-catechol (10% in toluene) is added. It is refluxed for 30 minutes and quenched with 7.0 gm methanol and refluxed 30 minutes. The reaction is monitored by IR. This makes a macromonomer which is a block polymer of butyl methacrylate//dimethylaminoethylmethacrylate 50 // 50 with a molecular weight of 5,000.

This macromonomer was used to make branched polymers of the invention that were effective as fuel oil stabilizers.

EXAMPLE 32 AN OCTYL METHACRYLATE//DMAEMA 40//60 BLOCK MACROMONOMER

A 3-liter flask is equipped with a mechanical stirrer, thermometer, $N_2$ inlet, drying tube outlet, and addition funnels. Toluene, 250.34 gm, THF, 249.61, p-xylene, 2.85 gm is charged to the flask. The catalyst tetrabutyl ammonium m-chlorobenzoate, 0.4 ml, is then added. Initiator, 1,1-bis(trimethyl siloxy) trimethyl siloxy-2-methyl propene, 23.29 gm is injected. Feed I [THF, 4.01, tetrabutyl ammonium m-chlorobenzoate, 0.4 ml] is started and added over 77 minutes. Feed II [n-octyl methacrylate, 200.25 gm] is started at 0.0 minutes and added over 25 minutes. Feed III [dimethylaminoethyl methacrylate, 300.12 gm] is started at 163 minutes and added over 24 minutes. At 245 minutes the reaction is quenched with 10.16 gm methanol, 7.12 gm water, 0.45 gm dichloroacetic acid. This generates a polymer that has one acid group at the end of the chain.

Preparation of Macromonomer

The macromonomer is prepared by reacting the acid group with GMA, an epoxy containing methacrylate. The acid group reacts with the epoxide and a polymerizable double bond is attached to the end of the polymer chain.

Some of the above solution (151.22 gm) refluxed, and 10 gm solvent stripped to pot temperature approximately equal to 91° C. Catalyst, 1.6 ml benzyl trimethyl ammonium hydroxide (40% in methanol), and 0.3 ml di-t-butyl-catechol (10% in toluene) is added. Feed I [glycidyl methacrylate, 1.56 gm] is started at 0.0 minutes and added over 10 minutes. Feed II [glycidyl methacrylate, 1.47 gm] is started at 62 minutes and added over 10 minutes. 0.5 ml of benzyl trimethyl ammonium hydroxide (40% in methanol) is injected at 80 minutes. At 210 minutes, 30.8 gm of solvent is distilled off until pot temperature equals approximately 105° C. 29.5 gm toluene is added. Initial acid number 6.39; final acid number 0.46. This makes a macromonomer which is a block polymer of octyl methacrylate//dimethylaminoethylmethacrylate 40//60 with a molecular weight of 5,000.

This macromonomer was used to make branched polymers of the invention that were useful as fuel oil stabilizers.

EXAMPLE 33 DMAEMA MACROMONOMER OF 3,000 MOL. WEIGHT CAPPED WITH METHACRYLIC ACID

A 3-liter flask is equipped with a mechanical stirrer, thermometer, $N_2$ inlet, drying tube outlet, and addition funnels. Toluene, 213.10 gm, and p-xylene, 1.0 gm is charged to the flask. The catalyst tetrabutyl ammonium m-chlorobenzoate 560 ml is then added. Initiator, 1-(glycidoxy)-1-trimethylsiloxy-2-methyl propene, 23.9 gm is injected. Feed 1 [tetrabutyl ammonium m-chlorobenzoate, 560ml, toluene, 4.0 gm] is started and added over 80 minutes. Feed II [dimethylaminoethyl methacrylate, 335.7 gm] is started at 0.0 minutes and added over 30 minutes. At 150 minutes 10 gm of methanol, 48 gm of isopropanol, 8.00 gm water are added to the above solution. This generates a polymer that has one epoxy group at the end of the chain.

Preparation of Macromonomer

The macromonomer is prepared by reacting the epoxy group with methacrylic acid MAA. The acid group reacts with the epoxide and a polymerizable double bond is attached to the end of the polymer chain.

The above solution is refluxed for 30 minutes and 128.3 gm of solvent is distilled off until pot temperature equal approximately 105° C. Then 28.6 gm of methacrylic acid, 0.72 gm di-t-butyl-catechol (10% in toluene), 930 ml of benzyl trimethyl ammonium hydroxide (40% in methanol) is added. It is refluxed for 3 hours. Initial acid number is 41.42, final acid number is 36.43. This makes a 3,000 Mn DMAEMA macromonomer.

This macromonomer was used to make branched polymers of the invention that were useful as fuel oil stabilizers.

We claim:

1. An oil soluble, basic amine-containing copolymer comprised of an addition-type polymeric main chain and a plurality of addition-type polymeric branches extending from the side thereof,
   wherein the main polymer chain is comprised of monomeric units derived from one or more polymerizable ethylenically unsaturated monomers with each monomer containing only one polymerizable ethylenic linkage and the main chain is free of individual basic hydrocarbon amine group monomeric substituents and comprises from about 50 to 99.5% by weight of the copolymer, and
   the polymeric side branches are comprised of monomeric units derived from one or more polymerizable ethylenically unsaturated monomers with each monomer containing only one polymerizable ethylenic linkage, and from about 10 to 100% of the monomeric units in the branches contain a basic amine group and the branches comprise from about 0.5 to 50% by weight of the copolymer.

2. A copolymer of claim 1 wherein the monomeric units of the main chain contain an alkyl substituent group containing from 1 to 60 carbon atoms.

3. A copolymer of claim 1 wherein the branches are randomly spaced along the main chain.

4. A copolymer of claim 2 wherein the alkyl-containing monomeric units are derivatives of acrylic or methacrylic acid.

5. A copolymer of claim 2 wherein the polymeric branches have a number average molecular weight of above 500.

6. A copolymer of claim 1 wherein the basic amine groups are selected from the group consisting of primary, secondary and tertiary amines.

7. A copolymer of claim 6 wherein the amine-containing monomeric unit is a dialkyl amino alkylene methacrylate.

8. A copolymer of claim 1 having an inherent viscosity of from about 0.1 to 1.0.

9. A copolymer of claim 1 containing a total of at least about 3 amino groups in each of the branches.

10. A copolymer of claim 1 which is substantially free of reactive functional groups other than the amine groups.

11. A copolymer of claim 1 wherein the main polymer chain is comprised of lauryl methacrylate and the polymeric side branches are comprised of dimethylaminoethyl methacrylate.

12. A stabilizing additive for petroleum distillate oil comprising a solution of 5-80% by weight of a copolymer of claim 1 in an oil miscible solvent.

13. A petroleum distillate oil stabilized with an effective amount of a copolymer of claim 1.

14. An oil of claim 13 containing from about 0.1 to 500 milligrams per liter of the copolymer.

15. An oil of claim 13 which is a fuel oil.

16. An oil of claim 13 which is a lubricating oil.

17. An oil of claim 16 containing from about 0.1 to 10% by weight of the copolymer.

18. A copolymer of claim 11 wherein the main polymer chain is a random copolymer of monomeric units selected from the group consisting of lauryl methacrylate and a macromonomer which consists essentially of a chain of dimethylaminoethyl methacrylate units with said chain having a single terminal ethylenically unsaturated polymerizable group derived from styrene and having a number average molecular weight of about 500.

* * * * *